(12) United States Patent
Henderson et al.

(10) Patent No.: US 11,283,183 B2
(45) Date of Patent: Mar. 22, 2022

(54) DEPLOYABLE REFLECTOR ANTENNA SYSTEMS

(71) Applicant: Eagle Technology, LLC, Melbourne, FL (US)

(72) Inventors: Philip J. Henderson, Palm Bay, FL (US); Robert M. Taylor, Rockledge, FL (US); Gustavo A. Toledo, Rockledge, FL (US); Michael R. Winters, Indian Harbour Beach, FL (US); Dana M. Rosennier, Melbourne, FL (US)

(73) Assignee: Eagle Technology, LLC, Melbourne, FL (US)

( * ) Notice: Subject to any disclaimer, the term of this patent is extended or adjusted under 35 U.S.C. 154(b) by 0 days.

(21) Appl. No.: 16/582,807

(22) Filed: Sep. 25, 2019

(65) Prior Publication Data
US 2021/0091479 A1    Mar. 25, 2021

(51) Int. Cl.
*H01Q 15/16* (2006.01)
*H02S 10/40* (2014.01)
(Continued)

(52) U.S. Cl.
CPC ........... *H01Q 15/161* (2013.01); *H01Q 1/288* (2013.01); *H01Q 19/17* (2013.01); *H02S 10/40* (2014.12); *H02S 30/20* (2014.12); *H02S 40/22* (2014.12)

(58) Field of Classification Search
CPC ........ H01Q 1/288; H01Q 15/161; H01Q 1/10; H01Q 1/14; H01Q 1/1242; H01Q 25/007;
(Continued)

(56) References Cited

U.S. PATENT DOCUMENTS 3,508,270 A    4/1970  Cook
3,559,919 A *  2/1971  Sass ................. H04B 7/185
                                                244/172.7
(Continued)

FOREIGN PATENT DOCUMENTS

EP    0892460 B1    10/2001
GB    2127624 A1    4/1984

OTHER PUBLICATIONS

Babuscia, A., et al., "Inflatable Antenna for CubeSat: Motivation for Development and Initial Trade Study," Acta Astronautica 91, 322-332 10.1016/j.actaastro.2013.06.005.
(Continued)

*Primary Examiner* — Andrea Lindgren Baltzell
*Assistant Examiner* — Yonchan J Kim
(74) *Attorney, Agent, or Firm* — Fox Rothschild, LLP; Robert Sacco; Carol Thorstad Forsyth

(57) ABSTRACT

A reflector antenna system comprising: a hoop assembly configured to expand between a collapsed configuration and an expanded configuration; a mesh reflector secured to the hoop assembly such that when the hoop assembly is in the collapsed configuration the mesh reflector is collapsed within the hoop assembly and when the hoop assembly is in the expanded configuration the mesh reflector is expanded to a shape that is intended to concentrate RF energy in a desired pattern; a mast assembly including an extendible boom to which the hoop assembly is secured by cords; and an antenna feed that is located on a vehicle so as to face a concave surface of the mesh reflector that is intended to concentrate RF energy in the desired pattern.

16 Claims, 16 Drawing Sheets

(51) Int. Cl.
*H02S 30/20* (2014.01)
*H02S 40/22* (2014.01)
*H01Q 1/28* (2006.01)
*H01Q 19/17* (2006.01)

(58) Field of Classification Search
CPC .......... H02S 30/20; H02S 40/22; H02S 10/40; B64G 1/428; B64G 1/44
See application file for complete search history.

(56) References Cited

U.S. PATENT DOCUMENTS

| | | | |
|---|---|---|---|
| 3,739,538 A | 6/1973 | Rubin | |
| 3,780,375 A | 12/1973 | Cummings et al. | |
| 4,550,319 A | 10/1985 | Ganssle et al. | |
| 4,587,526 A * | 5/1986 | Ahl, Jr. | B64G 9/00 343/883 |
| 5,859,619 A | 1/1999 | Wu et al. | |
| 5,864,324 A | 1/1999 | Acker et al. | |
| 5,963,182 A | 10/1999 | Bassily | |
| 6,225,965 B1 | 5/2001 | Gilger et al. | |
| 6,278,416 B1 | 8/2001 | Harless | |
| 6,323,819 B1 | 11/2001 | Ergene | |
| 6,911,953 B2 | 6/2005 | Gothard et al. | |
| 7,337,097 B2 | 2/2008 | Ih | |
| 9,496,621 B2 | 11/2016 | Meschini et al. | |
| 9,608,333 B1 * | 3/2017 | Toledo | H01Q 1/14 |
| 9,742,069 B1 | 8/2017 | Hollenbeck et al. | |
| 9,882,608 B2 | 1/2018 | Adriazola et al. | |
| 9,929,755 B2 | 3/2018 | Henry et al. | |
| 10,797,400 B1 * | 10/2020 | Henderson | H01Q 15/147 |
| 2011/0187627 A1 * | 8/2011 | Palmer | H01Q 15/161 343/915 |
| 2016/0197394 A1 * | 7/2016 | Harvey | H01Q 1/08 343/837 |
| 2017/0110803 A1 * | 4/2017 | Hodges | H01Q 1/288 |

OTHER PUBLICATIONS

Sullivan, Marvin R., LSST (Hoop/Column) Maypole Antenna Development Program, NASA Contractor Report 3558; NASA-CR-3558-PT-1 19820018481; Contract NAS1-15763, Jun. 1982.

* cited by examiner

DEPLOYABLE REFLECTOR ANTENNA SYSTEMS

BACKGROUND

Statement of the Technical Field

This disclosure concerns compact antenna system structures. More particularly, this disclosure concerns compact deployable reflector antenna systems.

Description of the Related Art

Various conventional antenna structures exist that include a reflector for directing energy into a desired pattern. One such conventional antenna structure is a hoop column reflector type system, also known as a high compaction ratio (HCR) reflector, which includes a hoop assembly, a collapsible mesh reflector surface and an extendible mast assembly. The hoop assembly includes a plurality of link members extending between a plurality of hinge members and the hoop assembly is moveable between a collapsed configuration wherein the link members extend substantially parallel to one another and an expanded configuration wherein the link members define a circumferential hoop. The reflector surface is secured to the hoop assembly and collapses and extends therewith. The hoop is secured by cords relative to top and bottom portions of a mast that maintains the hoop substantially in a plane. The mast extends to release the hoop, pull the mesh reflector surface into a shape that is intended to concentrate RF energy in a desired pattern, and tension the cords that locate the hoop. An example of an HCR type antenna system is disclosed in U.S. Pat. No. 9,608,333.

SUMMARY

This document concerns a reflector antenna system. The reflector antenna system comprising a hoop assembly, a mesh reflector, a mast assembly and an antenna feed. The hoop assembly comprises a plurality of link members extending between a plurality of hinge members. The hoop assembly is configured to expand between a collapsed configuration wherein the link members extend substantially parallel to one another and an expanded configuration wherein the link members define a circumferential hoop. The mesh reflector is secured to the hoop assembly such that when the hoop assembly is in the collapsed configuration the mesh reflector is collapsed within the hoop assembly, and when the hoop assembly is in the expanded configuration the mesh reflector is expanded to a shape that is intended to concentrate RF energy in a desired pattern. The mast assembly includes an extendible boom. The hoop assembly is secured by a plurality of cords relative to a top portion of the boom and to a bottom portion of the boom such that upon extension of the boom to a deployed condition the hoop assembly is supported by the boom. The antenna feed is located on a vehicle so as to face a concave surface of the mesh reflector that is intended to concentrate RF energy in the desired pattern. The antenna feed is configured to either illuminate the concave surface of the mesh reflector with RF energy or be illuminated by a reflector that has gathered RF energy from a distant source.

In some scenarios, the antenna feed comprises a plurality of radiating elements which are disposed around a periphery of the boom to form an array. Alternatively, the antenna feed comprises at least one radiating element disposed on a perimeter surface of a housing end wall through which the boom extends when in the deployed condition. For example, at least one radiating element is located at a corner of the housing end wall.

In other scenarios, the antenna feed comprises at least one radiating element that is movably coupled to a housing sidewall. The radiating element is able to be transitioned between a stowed position in which the at least one radiating element abuts the housing sidewall and a deployed position in which the at least one radiating element extends out from the housing sidewall. Alternatively, the antenna feed comprises a coaxial feed which is axially aligned with the mast assembly.

In those or other scenarios, a solar panel is provided with the reflector antenna system. The solar panel is movably coupled to a housing of the reflector antenna system or to the vehicle. For example, the solar panel is movable between (A) a stowed position in which the at least one solar panel extends parallel to a center axis of the housing in a first direction to (B) a deployed position in which the at least one solar panel extends parallel to the center axis of the housing in a second opposed direction, the second opposed direction being away from the mesh reflector when expanded. Alternatively, the solar panel that is movably coupled to a distal end of the boom such that the at least one solar panel can be transitioned between (A) a stowed position in which the at least one solar panel extends parallel to a center axis of the housing to (B) a deployed position in which the at least one solar panel extends perpendicular to the center axis of the housing and below a convex surface of the mesh reflector.

BRIEF DESCRIPTION OF THE DRAWINGS

This disclosure is facilitated by reference to the following drawing figures, in which like numerals represent like items throughout the figures.

DETAILED DESCRIPTION

Figures 1, 2:
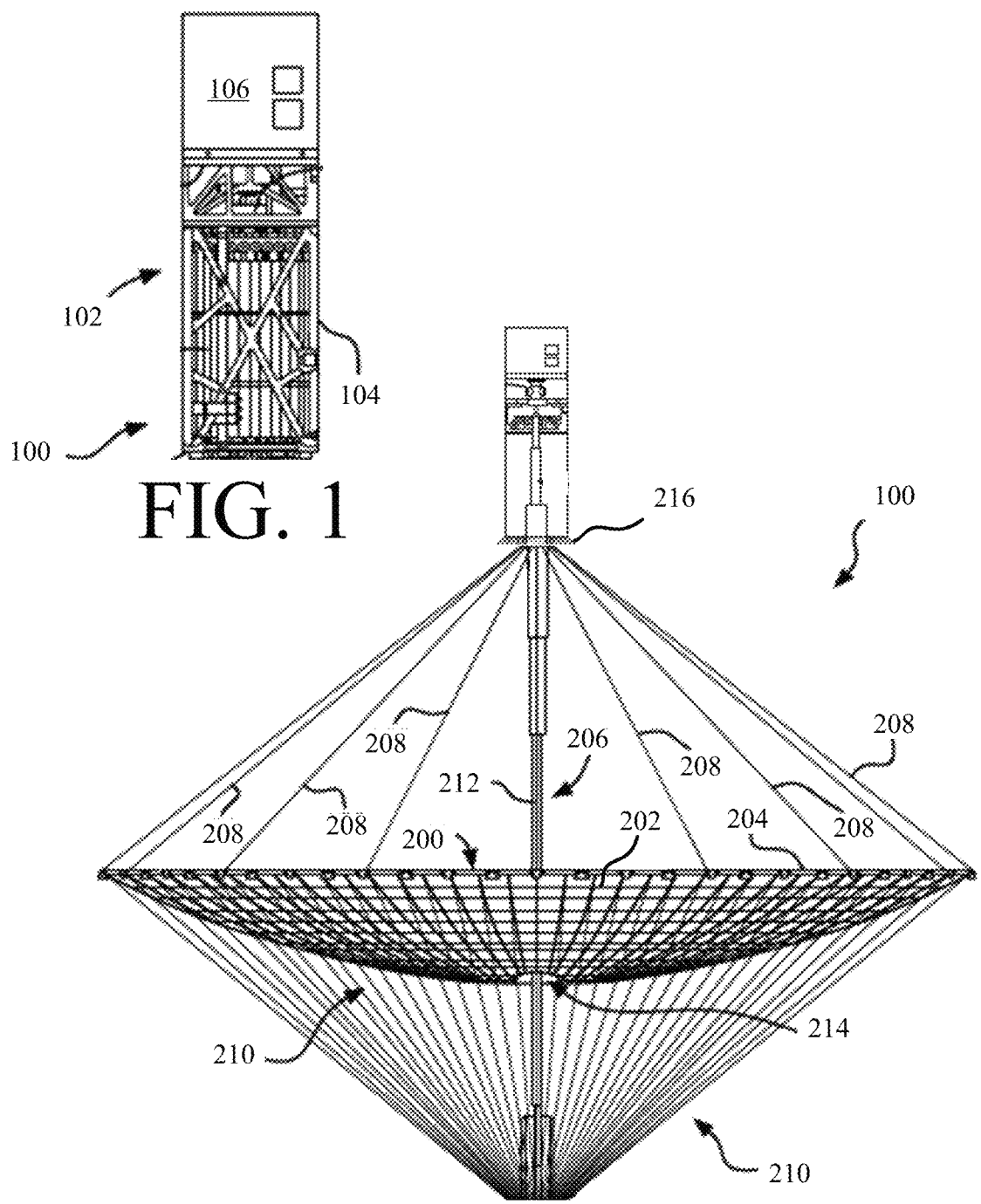
FIG. 1 is a side elevation view of a reflector antenna system in a stowed configuration.
FIG. 2 is a side elevation view of the reflector antenna system of FIG. 1 in a deployed configuration.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

This document concerns a reflector antenna system. The reflector antenna system comprising a hoop assembly, a mesh reflector, a mast assembly and an antenna feed. The hoop assembly comprises a plurality of link members extending between a plurality of hinge members. The hoop assembly is configured to expand between a collapsed configuration wherein the link members extend substantially parallel to one another and an expanded configuration wherein the link members define a circumferential hoop. The mesh reflector is secured to the hoop assembly such that when the hoop assembly is in the collapsed configuration the mesh reflector is collapsed within the hoop assembly, and when the hoop assembly is in the expanded configuration the mesh reflector is expanded to a shape that is intended to concentrate RF energy in a desired pattern. The mast assembly includes an extendible boom. The hoop assembly is secured by a plurality of cords relative to a top portion of the boom and to a bottom portion of the boom such that upon extension of the boom to a deployed condition the hoop assembly is supported by the boom. The antenna feed is located on a vehicle so as to face a concave surface of the mesh reflector that is intended to concentrate RF energy in the desired pattern. The antenna feed is configured to illuminate the concave surface of the mesh reflector with RF energy.

In some scenarios, the antenna feed comprises a plurality of radiating elements which are disposed around a periphery of the boom to form an array. Alternatively, the antenna feed comprises at least one radiating element disposed on a perimeter surface of a housing end wall through which the boom extends when in the deployed condition. For example, the at least one radiating element is located at a corner of the housing end wall.

In other scenarios, the antenna feed comprises at least one radiating element that is movably coupled to a housing sidewall. The radiating element is able to be transitioned between a stowed position in which the at least one radiating element abuts the housing sidewall and a deployed position in which the at least one radiating element extends out from the housing sidewall. Alternatively, the antenna feed comprises a coaxial feed which is axially aligned with the mast assembly.

In those or other scenarios, a solar panel is provided with the reflector antenna system. The solar panel is movably coupled to a housing of the reflector antenna system or to the vehicle. For example, the solar panel is movable between (A) a stowed position in which the at least one solar panel extends parallel to a center axis of the housing in a first direction to (B) a deployed position in which the at least one solar panel extends parallel to the center axis of the housing in a second opposed direction, the second opposed direction being away from the mesh reflector when expanded. Alternatively, the solar panel that is movably coupled to a distal end of the boom such that the at least one solar panel can be transitioned between (A) a stowed position in which the at least one solar panel extends parallel to a center axis of the housing to (B) a deployed position in which the at least one solar panel extends perpendicular to the center axis of the housing and below a convex surface of the mesh reflector.

Referring now to FIGS. 1-2, illustrations of a reflector antenna system 100 are provided. The reflector antenna system 100 generally comprises a housing 102 which is configured to stow a deployable mesh reflector 200. The housing 102 is coupled to a vehicle (e.g., a spacecraft) 106. The vehicle 106 comprises various types of equipment such as radio communication equipment. Radio communications equipment is well known in the art, and therefore will not be described herein.

The housing 102 comprises a frame structure 104 which defines an interior space for stowing of the deployable mesh reflector 200. The housing frame 104 may have various configurations and sizes depending on the design of the deployable mesh reflector 200. By way of example, the reflector antenna system 100 may include a deployable mesh reflector with a 1-meter aperture that is stowed within a housing 102 that is of 2 U cubes at packaging and having an approximately 10 cm×10 cm×20 cm volume. Alternatively, the reflector antenna system 100 may include a deployable mesh reflector with a 3-meter aperture that is stowed within a housing 102 that is of 12 U cubes at packaging and having an approximately 20 cm×20 cm×30 cm volume. Of course, the solution is not limited in this regard and other sizes and configurations of the systems are also possible. In some scenarios, the housing 102 is in the nanosat or microsat size range.

The deployable mesh reflector 200 comprises a collapsible, mesh reflector surface 202 which is supported by a circumferential hoop assembly 204. The reflector surface 202 has a shape when deployed that is selected so as to concentrate RF energy in a desired pattern. As such, the reflector surface 202 can be parabolic or can be specially shaped in accordance with the needs of a particular design. For example, in some scenarios, the reflector surface 202 is specially shaped in accordance with a predetermined polynomial function. Further, the reflector surface 202 can be a surface of revolution, but it should be understood that this is not a requirement. There are some instances when the reflector surface 202 can be an axisymmetric shape.

The hoop assembly 204 is supported by the mast assembly 206 via a plurality of cords 208 which extend between the housing 102 and the deployable mesh reflector 200. The mast assembly 206 includes an extendable boom 212. A further network of cords 210 are provided that extend between the deployable mesh reflector 200 and a free end of the extendable boom 212 to help define the shape of the mesh reflector surface 202.

The hoop assembly 204 and the mast assembly 206 are configured to collapse into a stowed configuration which fits within the interior space of the housing 102. When the antenna system arrives at a deployment location (e.g., an orbital location), the reflector antenna system 100 can be transitioned from the stowed configuration shown in FIG. 1 to the deployed configuration shown in FIG. 2.

A drive train assembly (not shown) is positioned within the housing 102 and is configured to telescopically extend, scissor, or unroll to extend the boom 212 from the stowed configuration shown in FIG. 1 to the deployed configuration shown in FIG. 2. The extending of the boom 212 can be facilitated in accordance with various different conventional mechanisms. The exact mechanism selected for this purpose is not critical. As such, suitable arrangements can include mechanisms which involve telescoping sections, mechanisms which operate in accordance with a scissoring action, and mechanisms which unroll from a drum or spool. As explained hereinafter, the hoop assembly 204 is advantageously configured to be self-deploying such that the deployed hoop structure shown in FIG. 2 is achieved without any motors or actuators other than the drive train assembly which is used to extend the mast. Still, the solution is not limited in this respect and in some scenarios a motorized or actuated deployment of the hoop is contemplated.

The boom 212 is formed of any suitable material such as a metal material, a graphite material and/or a dielectric material. In the dielectric material scenarios, the boom 212 can include, but is not limited to, a thermoplastic polytherimide ("PEP") resin composite tube, a polyimide inflatable tube, a UV hardened polyimide tube, or a tube formed of a composite of glass fiber-reinforced polymer (fiberglass weave or winding).

Deployable mesh reflectors based on the concept of a hoop assembly and an extendable mast are known. For example, details of such an antenna system are disclosed in U.S. Pat. No. 9,608,333 and U.S. patent application Ser. No. 16/180,836, which are incorporated herein by reference. However, a brief description of the hoop assembly is provided with respect to FIGS. 3-4 so as to facilitate an understanding of the solution presented herein.

The hoop assembly 204 is comprised of a plurality of upper hinge members 302 which are interconnected with a plurality of lower hinge members 304 via link members 306. Each link member 306 is comprised of a linear rod which extends between opposed hinge members. In the stowed configuration illustrated in FIG. 3, the upper hinge members 302 collapse adjacent to one another and the lower hinge members 304 collapse adjacent to one another with the link members 306 extending therebetween in generally parallel alignment. One or two sync rods 308 may extend between each connected upper and lower hinge member 302, 304. As shown in FIG. 4, the link member 306 and the sync rod 308 are elongated rods extending between opposing ends 402/ 404, 406/408, respectively. Each end 402, 404, 406, 408 is configured to be pivotally connected to a respective hinge body 410, 412 of an upper and lower hinge members 302, 304 at a pivot point 414, 416. Accordingly, as the hinge members 302, 304 are moved apart as shown in FIG. 4, the link members 306 pivot and the sync rods 308 maintain the rotation angle between adjacent hinge members 302, 304. This arrangement facilitates synchronous deployment of the hoop assembly 204. The hoop may be driven from a stowed state to a deployed state by springs, motors, cord tension, or other mechanism.

Figure 3:
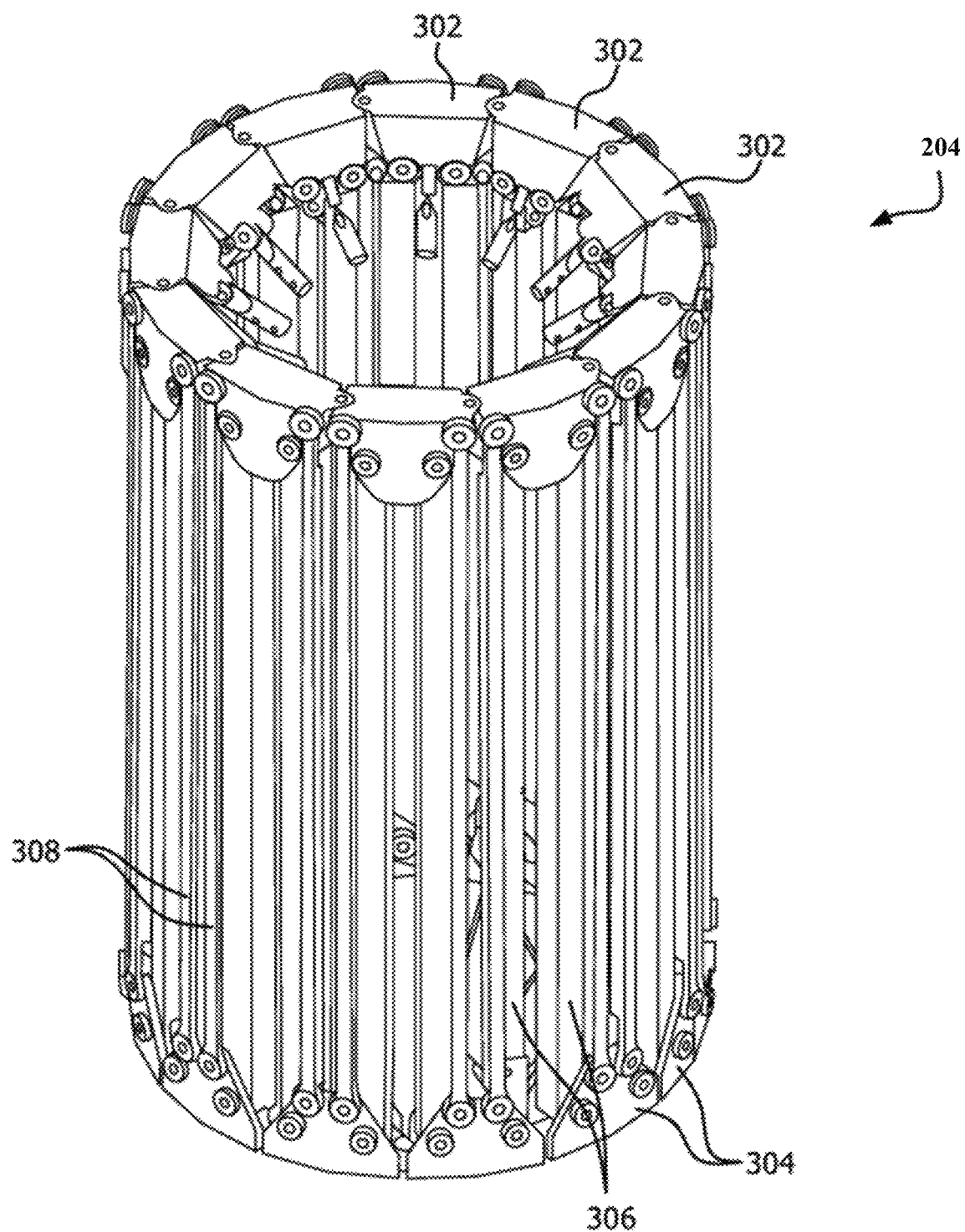
FIG. 3 is an isometric view of an exemplary hoop assembly in a stowed configuration.
Figure 4:
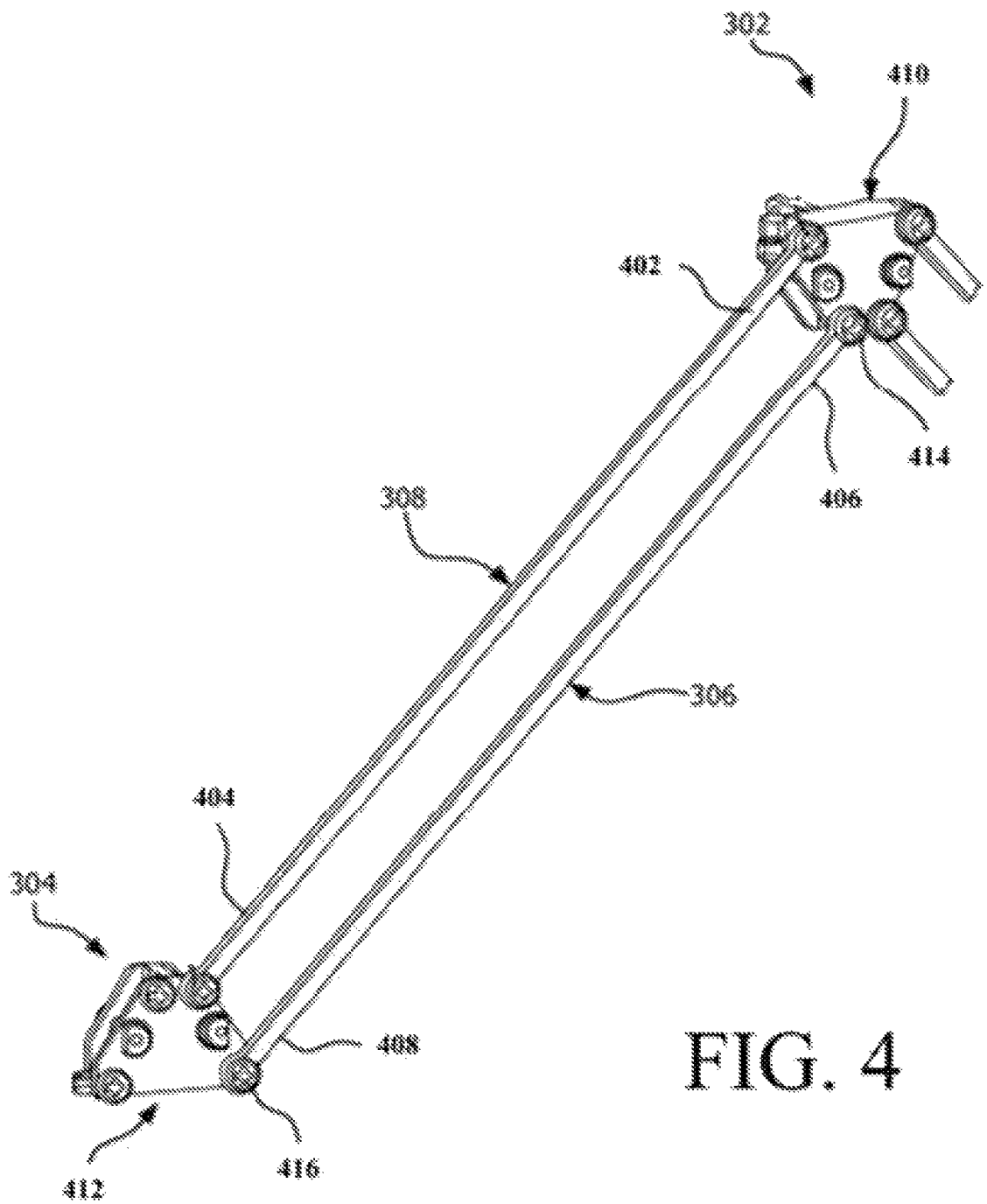
FIG. 4 is an isometric view of a pair of hinge assemblies interconnected by sync rods in a partially deployed configuration.

As shown in FIGS. 3-4, the upper and lower hinge members 302, 304 are circumferentially offset from one another such that a pair of adjacent link members 306 which are connected to one upper hinge member 302 are connected to two adjacent, but distinct lower hinge members 304. In this manner, upon deployment, the hoop assembly 204 defines a continuous circumferential hoop structure with link members extending between alternating upper and lower hinge members (see FIG. 1).

As noted above, the mesh reflector surface 202 is secured to the hoop assembly 204 and collapses and extends therewith. Cords 208, 210 attach each hinge member 302, 304 to the top and bottom portions of the mast assembly 206 so that the load path goes from one end of the mast assembly 206 to the other end of the mast assembly 206. An aperture 214 is defined in the center of the deployable mesh reflector 200 for allowing the boom 212 to pass therethrough. The cords 208, 210 maintain the hoop assembly 204 in a plane. The hoop assembly 204 extends via torsion springs (not shown) which are disposed on the hinge members 302, 304. The torsion springs are biased to deploy the mesh reflector surface 202 to the configuration shown in FIG. 2. Cords 210 attach from the collapsible mesh reflector surface 202 to the base of the mast assembly 206, and are used to pull the mesh down into a predetermined shape selected for the reflector surface 202. Accordingly, the hoop assembly 204 is not required to have depth out of plane to form the reflector into a parabola.

The mast assembly 206 can comprise a slit-tube type boom 212 which is stored on a spool within a housing 102. As is known, slit-tube type booms can have two configurations. In the stowed configuration, the slit-tube type boom can flatten laterally and can be rolled longitudinally on a spool within the housing 102. In the deployed configuration, the slit-tube type boom can be extended longitudinally and rolled or curved laterally. A drive train assembly within the housing 102 is configured to extend the slit tube type boom for deployment. While a slit-tube type boom is described with respect to the given illustrative antenna system, the present solution is not limited to such and the mast assembly can have other configurations. For example, in some scenarios, the mast assembly can comprise a rolled boom with a lenticular or open triangular cross section, or a pantograph configuration. In other scenarios, the mast assembly may include: a plurality of links joined by hinges which are moveable between a collapsed configuration wherein the link members extend substantially parallel to one another and an expanded configuration wherein the link members align co-linear to one other; or a plurality of links that slide relative to one another such that the mast assembly automatically extends from a collapsed configuration where the links are nested together and an expanded configuration wherein the link members extend substantially end to end. The various mast configurations are described in greater detail in U.S. Pat. No. 9,608,333.

An RF feed 216 for the reflector antenna system 100 is coupled to the vehicle 106 via the housing 102. The RF feed 216 is disposed in front of and faces the mesh reflector surface 202 when the reflector antenna system 100 is in its deployed position shown in FIG. 2. The RF feed 216 can have any one of a number of configurations shown in FIGS. 5-8. This arrangement of the RF feed 216 has certain advantages. For example, the RF feed arrangement provides improvements with regard to signal losses and reflector deployment since a coaxial cable is no longer required to extend through the mast assembly. The RF feed arrangement also provides a more efficient feed network since the RF feed 216 is mounted relatively close to the power and signal source. This can be an important design factor in scenarios involving high frequencies (e.g., Ka Band systems) and/or high power levels where the length of an RF feed path is advantageously minimized.

Figure 5:
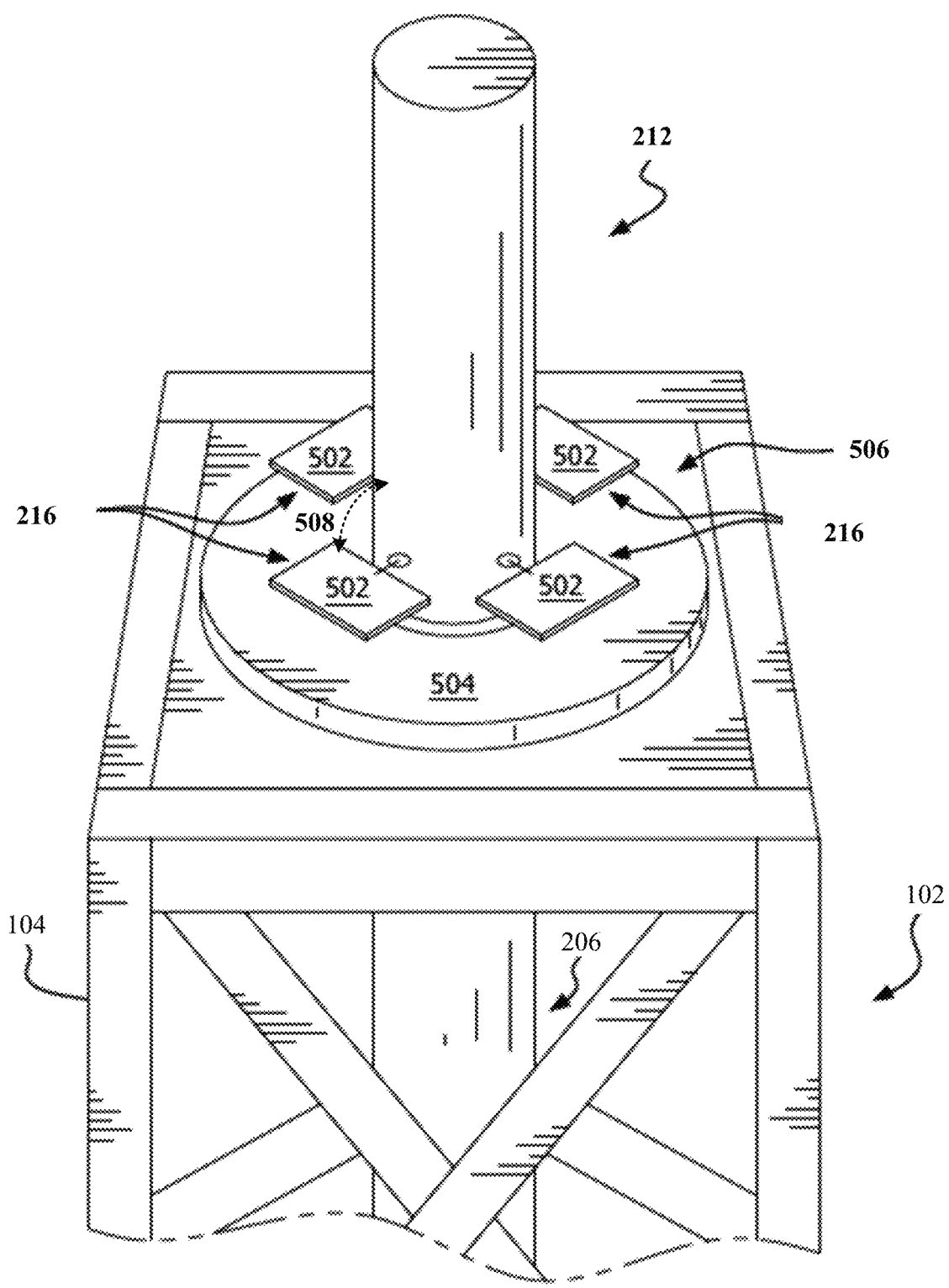
FIG. 5 is a conceptual drawing showing an antenna feed configuration for the reflector antenna system of FIGS. 1-4.

As shown in FIG. 5, the RF feed 216 is disposed around a periphery of the mast assembly 206. The RF feed 216 is disposed adjacent to a deployment face 506 of the housing 102 from which the mast assembly 206 extends in its deployed configuration. The RF feed 216 comprises a plurality of distributed feed elements 502 disposed circumferentially around a periphery of the boom 212 of the mast assembly 206. Although four feed elements are shown in FIG. 5, the present solution is not limited in this regard. Any number of feed elements can be provided in accordance with a given application (e.g., 1 to N feed elements are provided, where N is an integer). The distributed feed elements 502 can include, but are not limited to, patch antenna(s), dipole antenna(s), monopole antenna(s), horn(s), and/or helical coil(s). The feed elements 502 are suspended over a ground plate 504. The distributed feed elements 502 may be configured to operate as a phased array.

The distributed feed elements 502 may be movable relative to the boom 212 as shown by arrows 508. This movability of the feed elements 502 is provided via mechanical mechanisms such as hinges. This movability allows the distributed feed elements 502 to be transitioned between a stowed configuration (not shown) to a deployed configuration shown in FIG. 5. The feed elements 502 are moved away from the boom 212 in order to transition the feed elements 502 from their stowed configurations to their deployed configurations. In contrast, the feed elements 502 are moved towards the boom 212 in order to transition the feed elements 502 from their deployed configurations to their stowed configurations.

The distributed feed elements 502 each have a generally rectangular shape. The present solution is not limited in this regard. The distributed feed elements 600 can have any shape selected in accordance with a given application.

Figure 6:
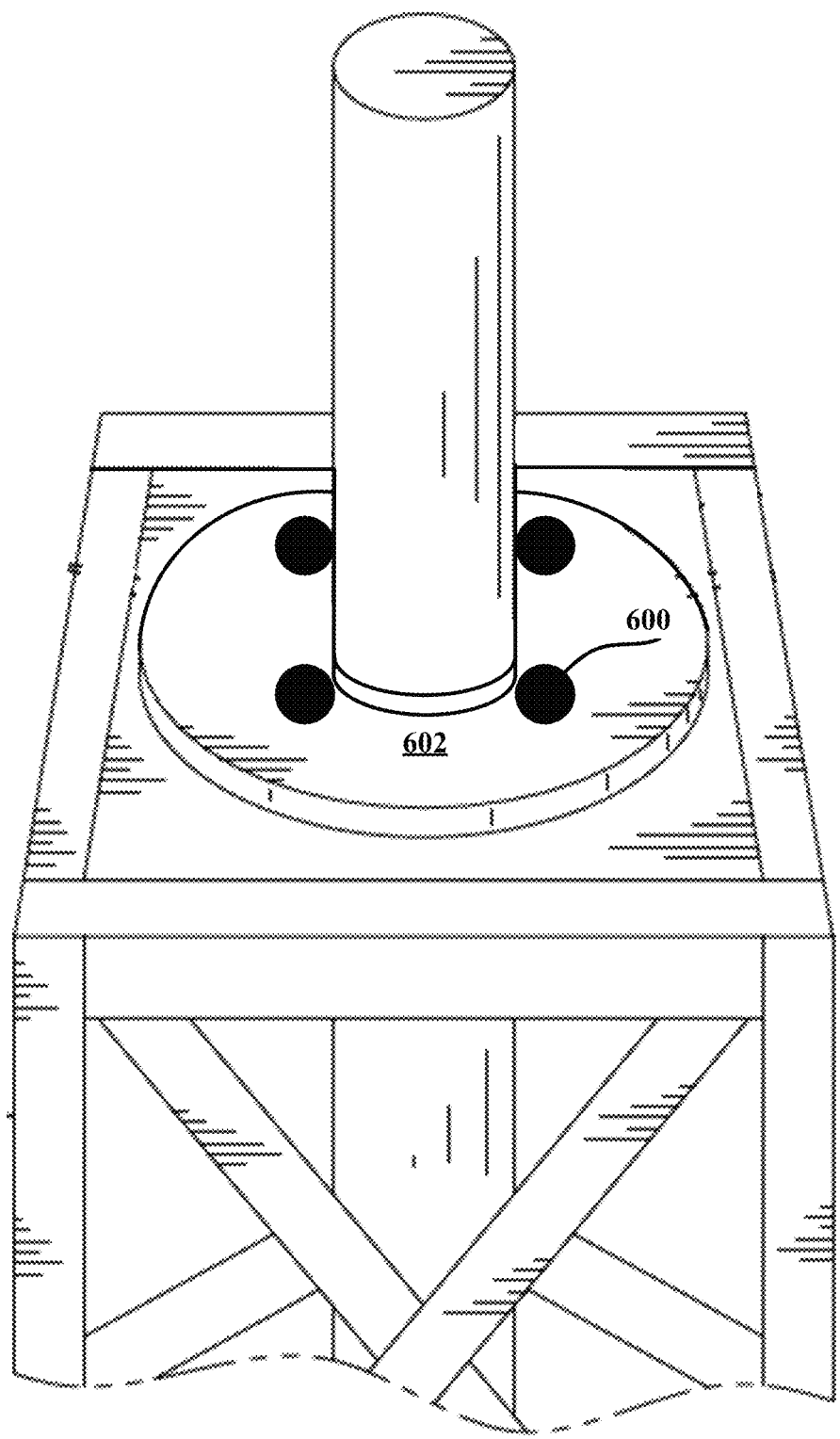
FIGS. 6-8 each provide a conceptual drawing showing another antenna feed configuration for a reflector antenna system.

As shown in FIG. 6, the RF feed is disposed around a periphery of the mast assembly. The RF feed is disposed adjacent to a deployment face of the housing from which the mast assembly extends in its deployed configuration. The RF feed comprises a plurality of distributed feed elements 600 disposed circumferentially around a periphery of the boom of the mast assembly. Although four feed elements are shown in FIG. 6, the present solution is not limited in this regard. Any number of feed elements can be provided in accordance with a given application (e.g., 1 to N feed elements are provided, where N is an integer). The distributed feed elements 600 can include, but are not limited to, patch antenna(s), dipole antenna(s), monopole antenna(s), horn(s), and/or helical coil(s). The feed elements 600 are coupled to a plate 602 (which may or may not provide the ground plane). The distributed feed elements 600 may be configured to operate as a phased array.

The distributed feed elements 600 each have a generally circular shape. The present solution is not limited in this regard. The distributed feed elements 600 can have any shape selected in accordance with a given application.

Figure 7:
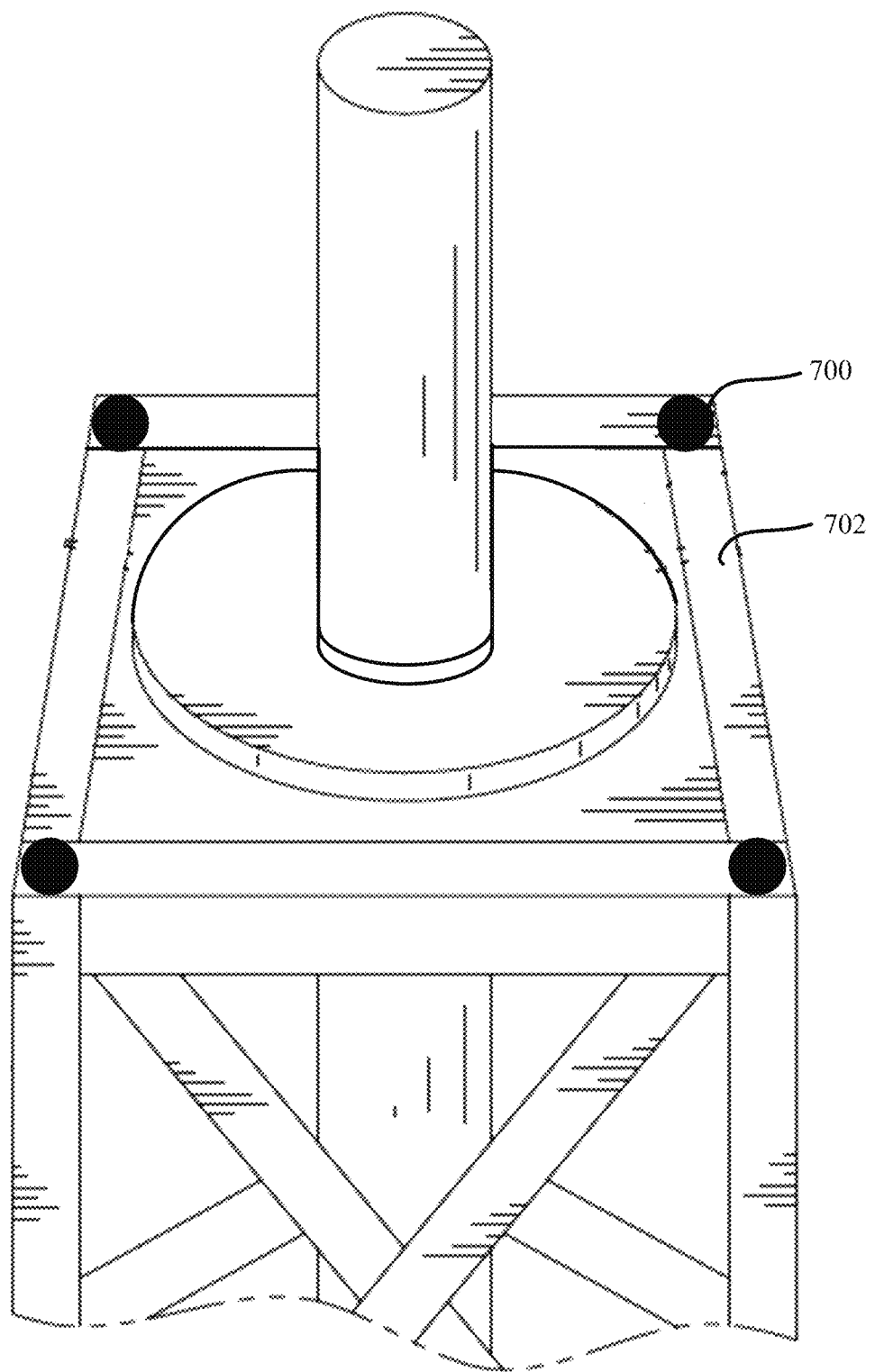

As shown in FIG. 7, the RF feed is disposed on a perimeter surface 702 of the housing. The RF feed comprises one or more feed elements 700. The feed element(s) 700 can include, but is(are) not limited to, patch antenna(s), dipole antenna(s), monopole antenna(s), horn(s), and/or helical coil(s). The feed element(s) 700 may be configured to operate as a phased array.

The feed element(s) 700 is(are) disposed at one or more corners of the housing's perimeter surface 702. The feed elements 700 each have a generally circular shape. The present solution is not limited in this regard. The feed element(s) 700 can be disposed at any location(s) on the perimeter surface 702, and/or cover all or any portion of the perimeter surface 702. The feed elements 700 can additionally have any shape selected in accordance with a given application.

Figure 8:
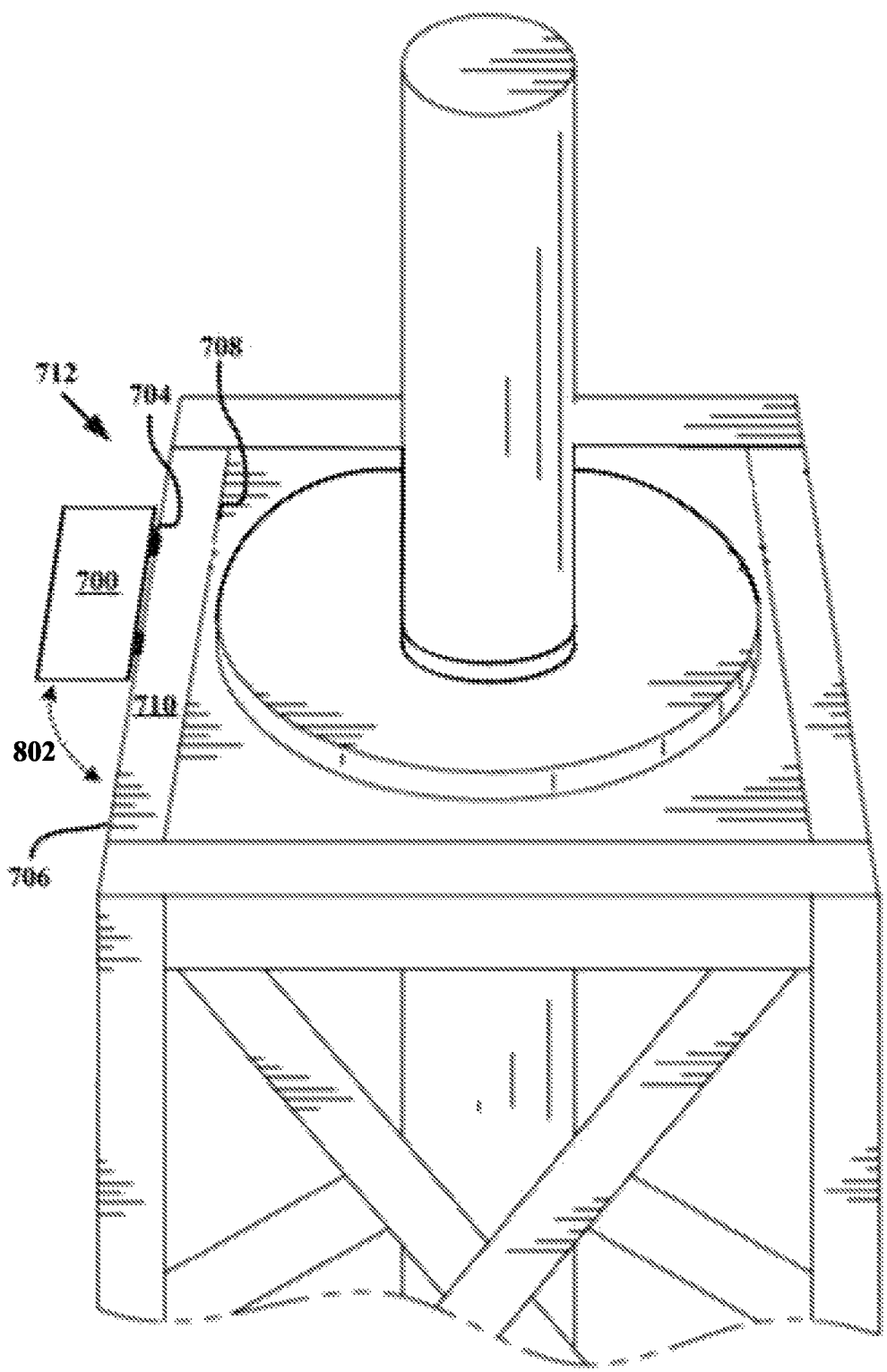

As shown in FIG. 8, the RF feed is movably coupled to an exterior surface 706 of one or more housing sidewalls 712. The present solution is not limited in this regard. Alternatively, the RF feed is movably coupled to an interior surface 708 of the housing sidewall(s) or an upper surface 710 of the housing sidewall(s).

The RF feed comprises one or more feed elements 700 that can move in two opposed directions shown by arrow 802. This movability of the feed element(s) 700 is provided via mechanical mechanisms such as hinges 704. Hinges are well known in the art, and therefore will not be described herein. This movability allows the feed element(s) 700 to be transitioned between a stowed configuration (not shown) and a deployed configuration (shown in FIG. 8). The feed element(s) 700 is(are) moved away from the housing surface 706 in order to transition the feed element(s) 700 from its(their) stowed configuration to its(their) deployed configuration. In contrast, the feed element(s) 700 is(are) moved towards the housing surface 706 in order to transition the feed element(s) 700 from its(their) deployed configuration to its(their) stowed configuration.

Figure 9:
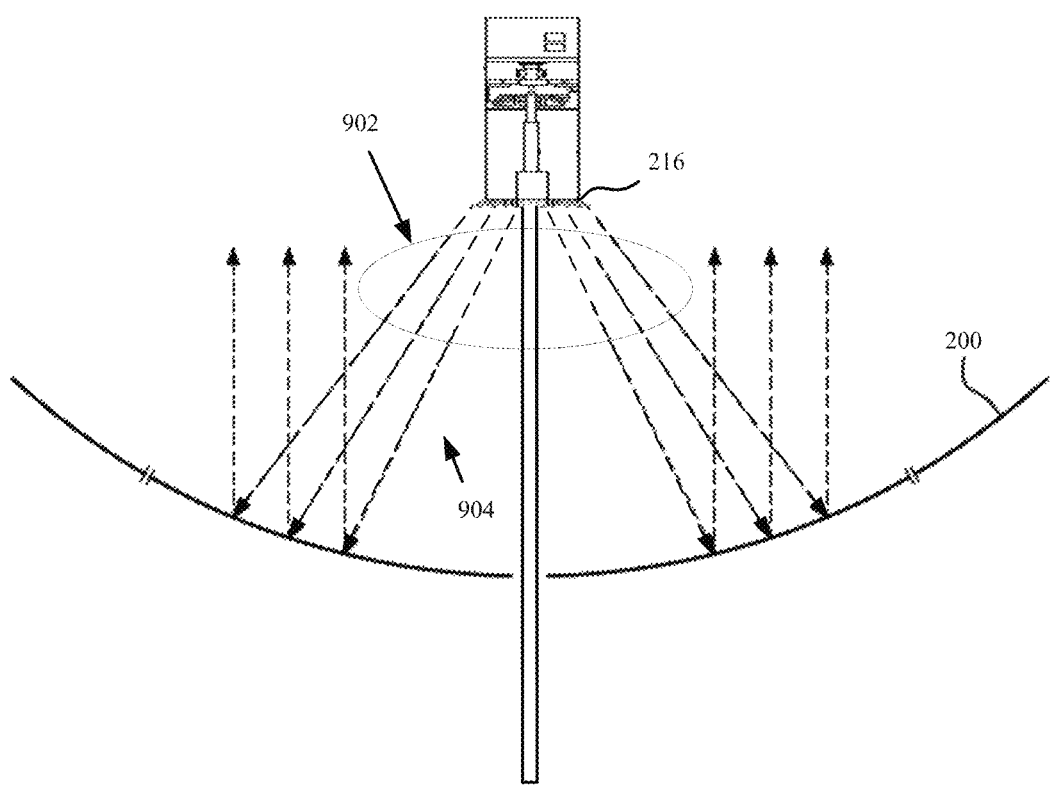
FIG. 9 is a schematic drawing which is useful for understanding the operation of the antenna system shown in FIGS. 1-5.

As shown in FIG. 9, the RF feed 216 is configured so that the feed element(s) is(are) capable of generating an RF feed beam pattern 902 that is suitable for communicating RF energy 904 directly to the mesh reflector 200. The RF energy 904 is reflected by the mesh reflector 200 which forms the final beam. It will be appreciated that FIG. 9 is illustrative of a transmit scenario, but the present solution is not limited in this regard. The antenna system 100 will operate in a reciprocal manner such that both receive and transmit operations are supported.

Figure 10:
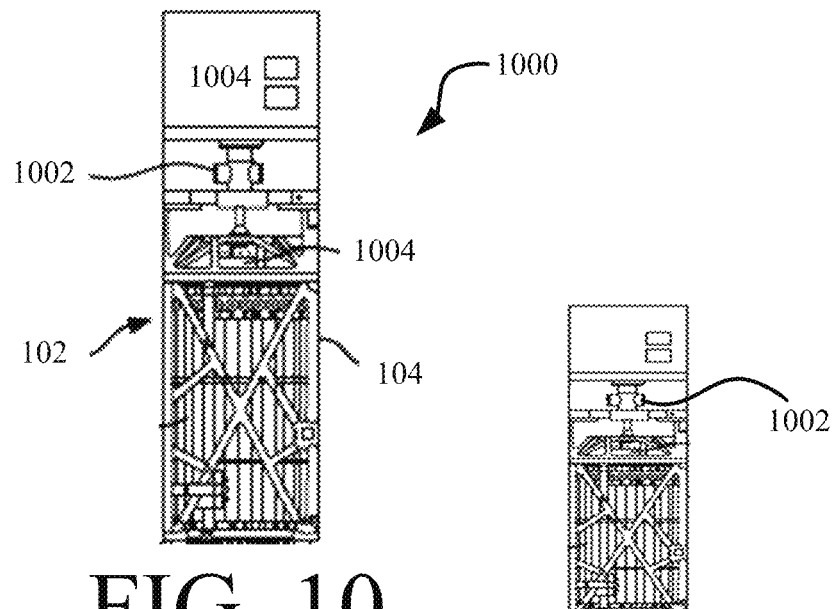
FIG. 10 is a side elevation view of a reflector antenna system with an alternative antenna feed arrangement, shown in a stowed configuration.
Figure 11:
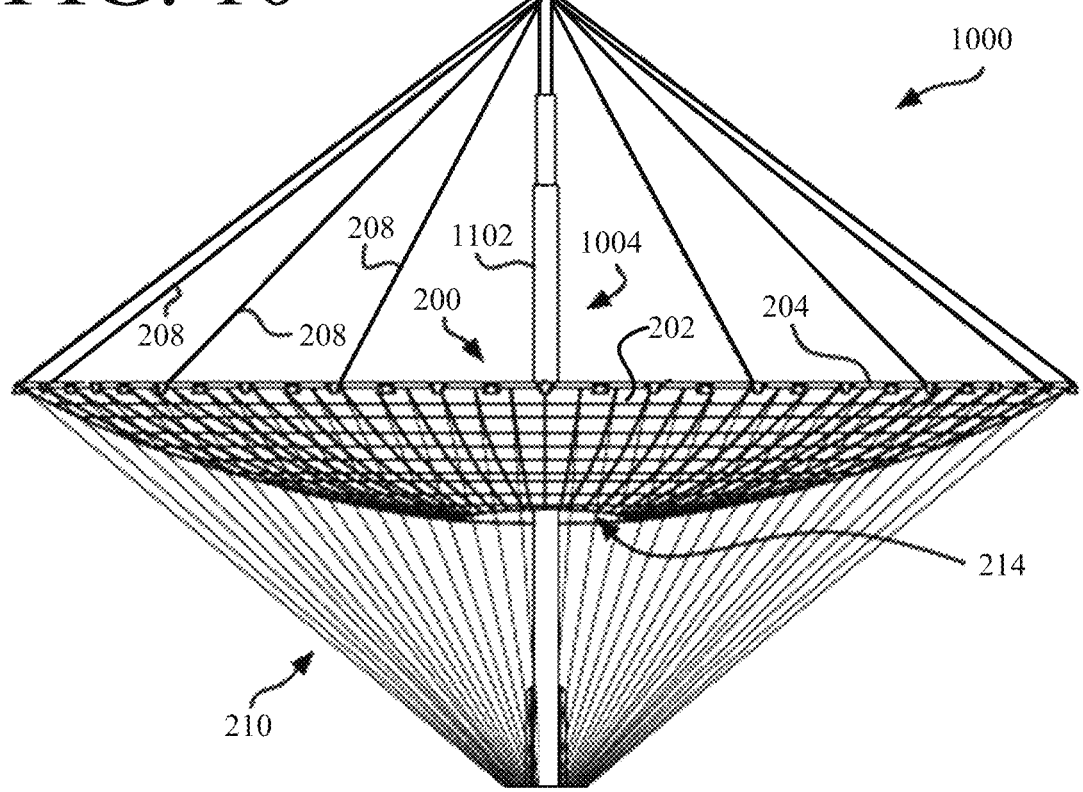
FIG. 11 is a side elevation view of the reflector antenna system of FIG. 10 in a deployed configuration.

Referring now to FIGS. 10-11, there is shown an antenna system 1000 which is similar to the antenna system 100 but has an alternative feed configuration. The antenna system 1000 can in some scenarios comprise a portion of a vehicle (e.g., a spacecraft) 1004. The vehicle 1004 includes various types of equipment such as radio communication equipment. Radio communications equipment is well known in the art, and therefore will not be described herein. Corresponding structure in FIGS. 10-11 is identified with the same reference numbers that are used in FIGS. 1-2.

In this example, the antenna system 1000 includes a coaxial feed assembly 1002 disposed in the housing 102, aligned coaxial with mast assembly 1102 and boom 1004. The theory and operation of coaxial feed systems are known in the art and therefore will not be described here in detail. However, a brief description of the coaxial feed assembly is provided below to facilitate an understanding of the solution presented herein.

Figures 12, 13:
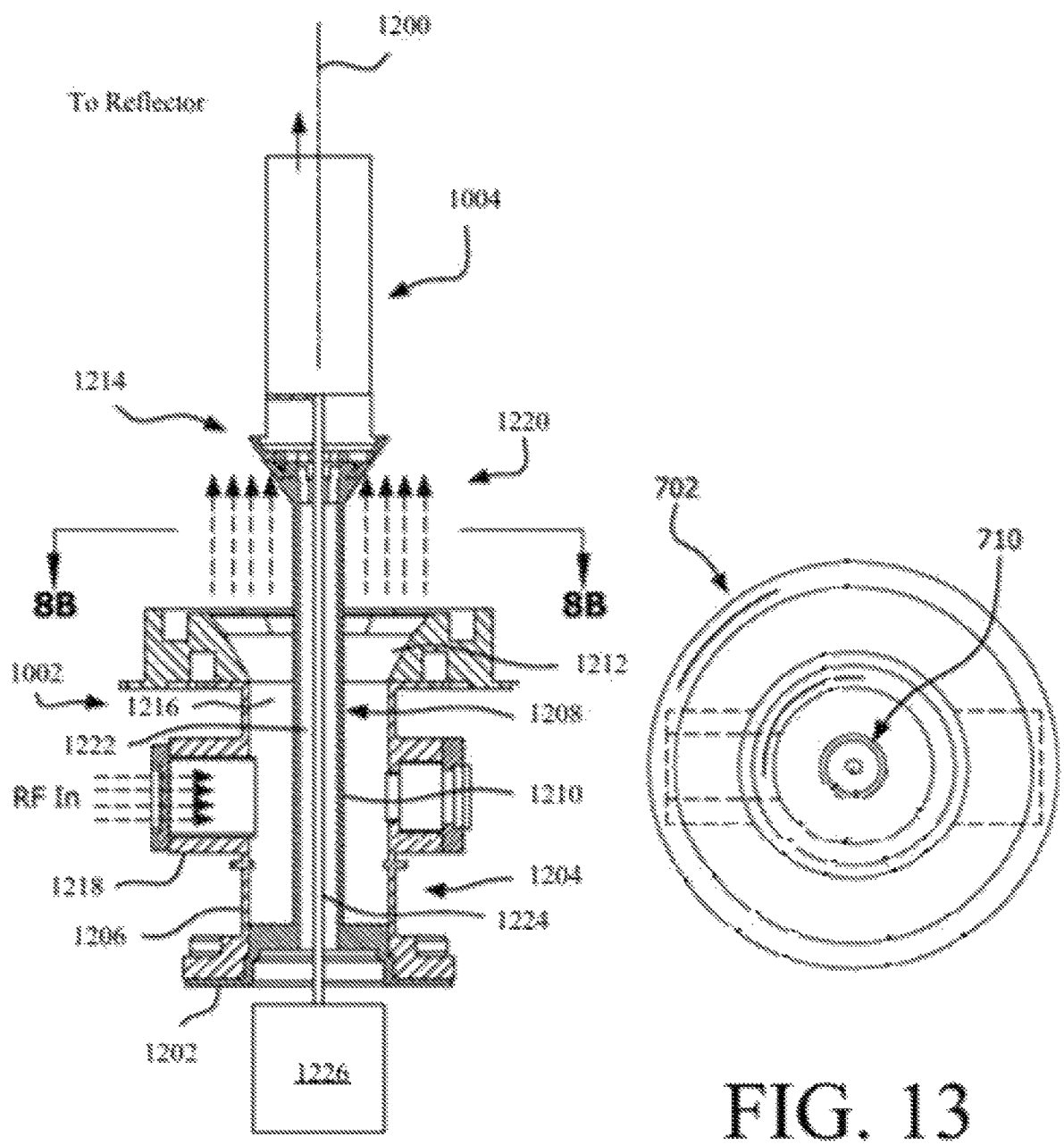
FIGS. 12 and 13 are a set of drawings that are useful for understanding a coaxial feed arrangement for the reflector antenna system of FIGS. 10-11.

The coaxial feed assembly 1002 is shown in further detail in FIGS. 12-13. The coaxial feed assembly 1002 is axially aligned along a central axis 1200 and includes a mounting interface 1202 to facilitate mounting in the housing 102. The coaxial feed assembly 1002 is also axially aligned with the elongated length of the boom assembly 1004. The mounting interface supports a waveguide section 1204 which includes a conductive cylindrical outer wall 1206. The cylindrical outer wall 1206 is aligned on central axis 1200 and is coaxial with a cylindrical inner waveguide structure 1208. Inner waveguide structure 1208 extends axially along the length of the waveguide section 1204 and forms a conductive inner wall 1210 of the waveguide structure 1208. This inner waveguide structure 1208 also extends coaxially through a horn 1212 to a mast interface 1214. The mast interface 1214 provides a structural support for the mast assembly 1004 and its associated boom.

The inner wall 1210 and the outer wall 1206 together define an elongated toroidal-shaped waveguide cavity 1216. RF energy communicated to the waveguide cavity 1216 from a port 1218 is communicated through the toroidal-shaped waveguide cavity 1216 to the horn 1212. The port 1218 can advantageously comprise an Ortho-Mode Transducer ("OMT"). The OMT combines two linearly orthogonal waveforms and in some cases can be used in an ortho-mode junction to create a circular polarized waveform. The horn 1212 forms an RF feed beam 1220 which is coaxial with the boom 1004 and directed toward the reflector.

Figure 14:
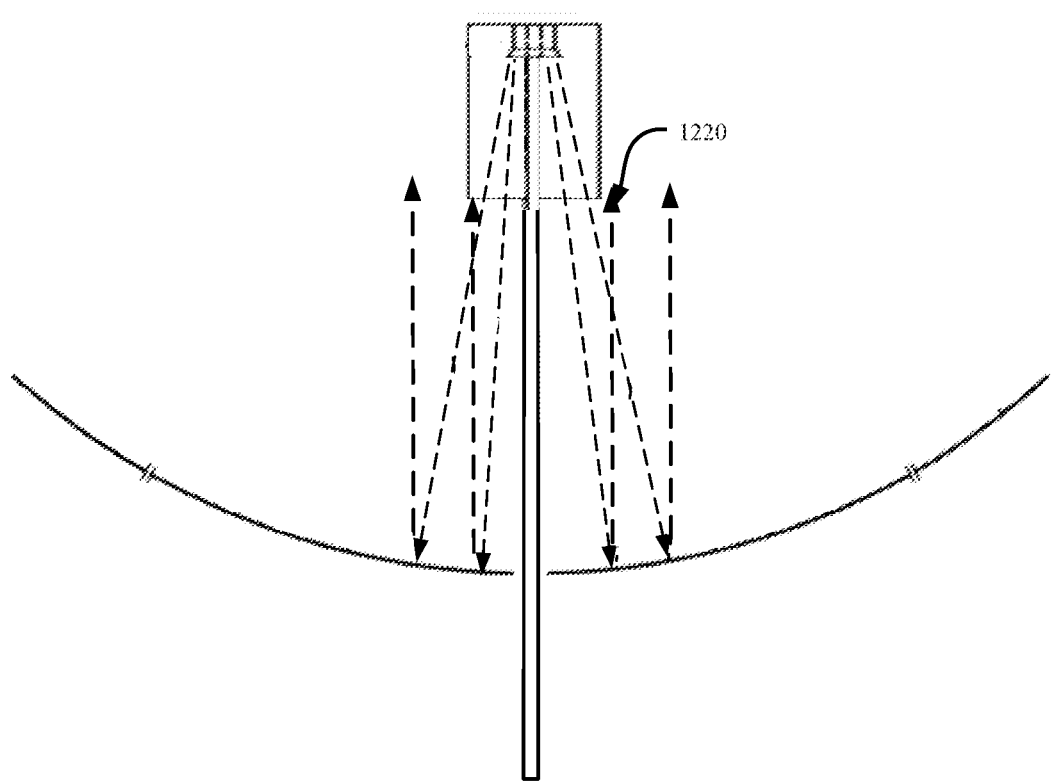
FIG. 14 is a schematic drawing that is useful for understanding the operation of the reflector antenna system shown in FIGS. 10-13.

A transmit scenario is illustrated in FIG. 12. It should be understood that the operation of the feed is reciprocal in the receive direction. Accordingly, both receive and transmit operations are supported for the antenna system 1000. The resulting feed configuration may be understood with reference to FIG. 14, which shows that an RF feed beam 1220 produced by coaxial feed assembly 1002 is communicated in axial alignment with the boom 1004 and directed toward a reflector.

In the configuration shown in FIGS. 10-13, a hollow cylindrical cavity 1222 is provided internal of the cylindrical inner waveguide structure 1208. This hollow cylindrical cavity extends along the axial length of the waveguide section 1204 and the horn 1212 to the mast interface 1214. Accordingly, a mast deployment component, which facilitates extension a boom 1004 from a stowed configuration shown in FIG. 10 to a deployed configuration shown in FIG. 11, can be disposed within the hollow cylindrical cavity 1222. So, one advantage of the feed configuration shown is that it allows access to deploy the boom at a location aligned on the center axis of the feed. In some scenarios, the mast deployment component 1224 can extend from a mast deployment actuator 1226 (located adjacent to the vehicle mounting interface) to the mast interface 1214. The mast deployment actuator 1226 can comprise a drive train assembly, a motorized spool from which a rolled boom (e.g., a slit tube boom) is deployed, a rotating screw, or any other assembly or configuration suited for urging the mast assembly 1004 to its deployed configuration.

The arrangement shown in FIGS. 10-14 has several advantages. As shown in FIGS. 10-11, the feed is placed above the mesh reflector surface when deployed. A further advantage of this configuration is that the feed can be located directly adjacent to the vehicle where power and RF signals are most easily coupled to the feed assembly with minimal losses. A further advantage of this approach that the feed is moved closer to the vehicle, which further minimizes distance, RF losses and antenna moment of inertia.

Figure 15:
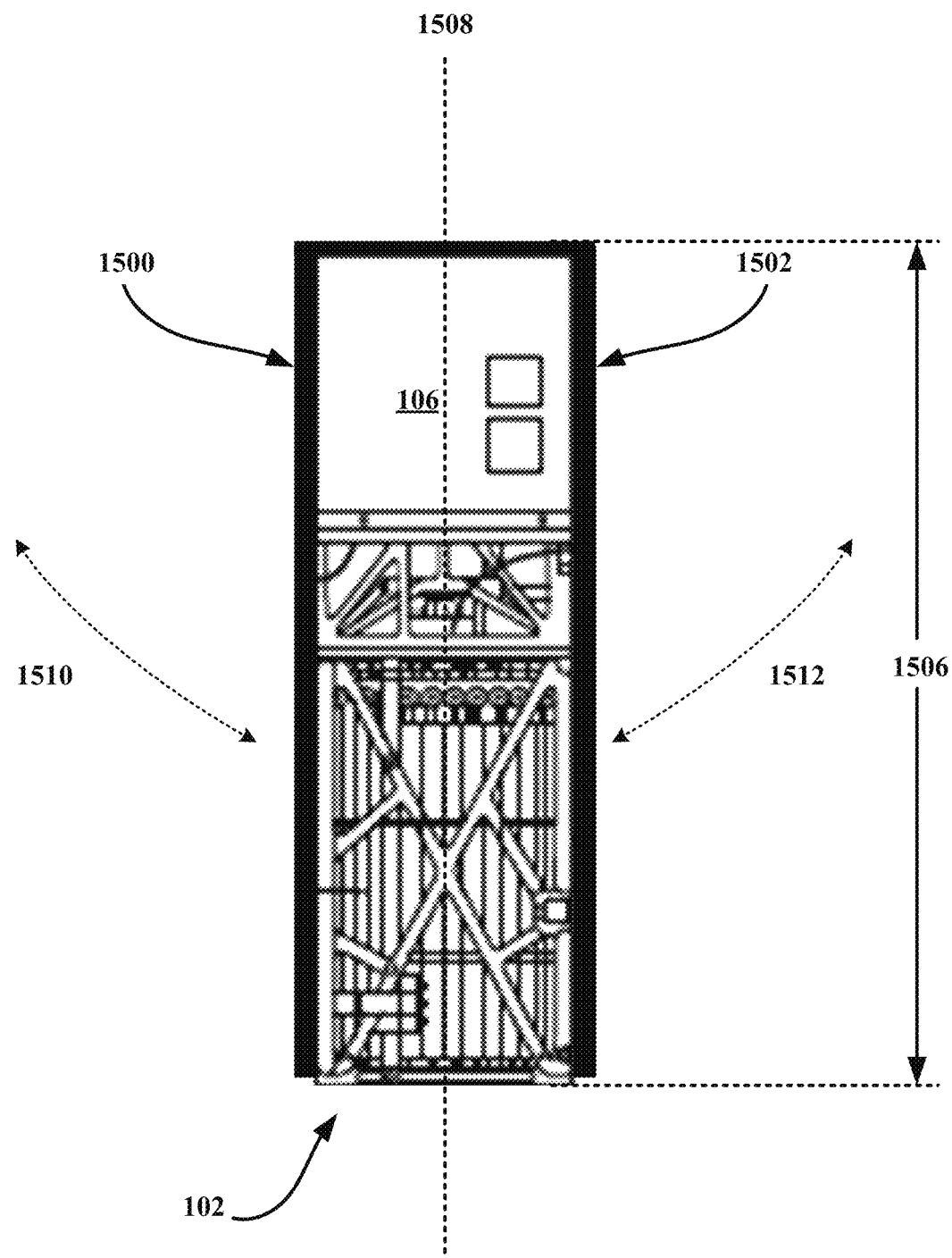
FIG. 15 is a side elevation view of a reflector antenna system with solar panels, shown in a stowed configuration.
Figure 16:
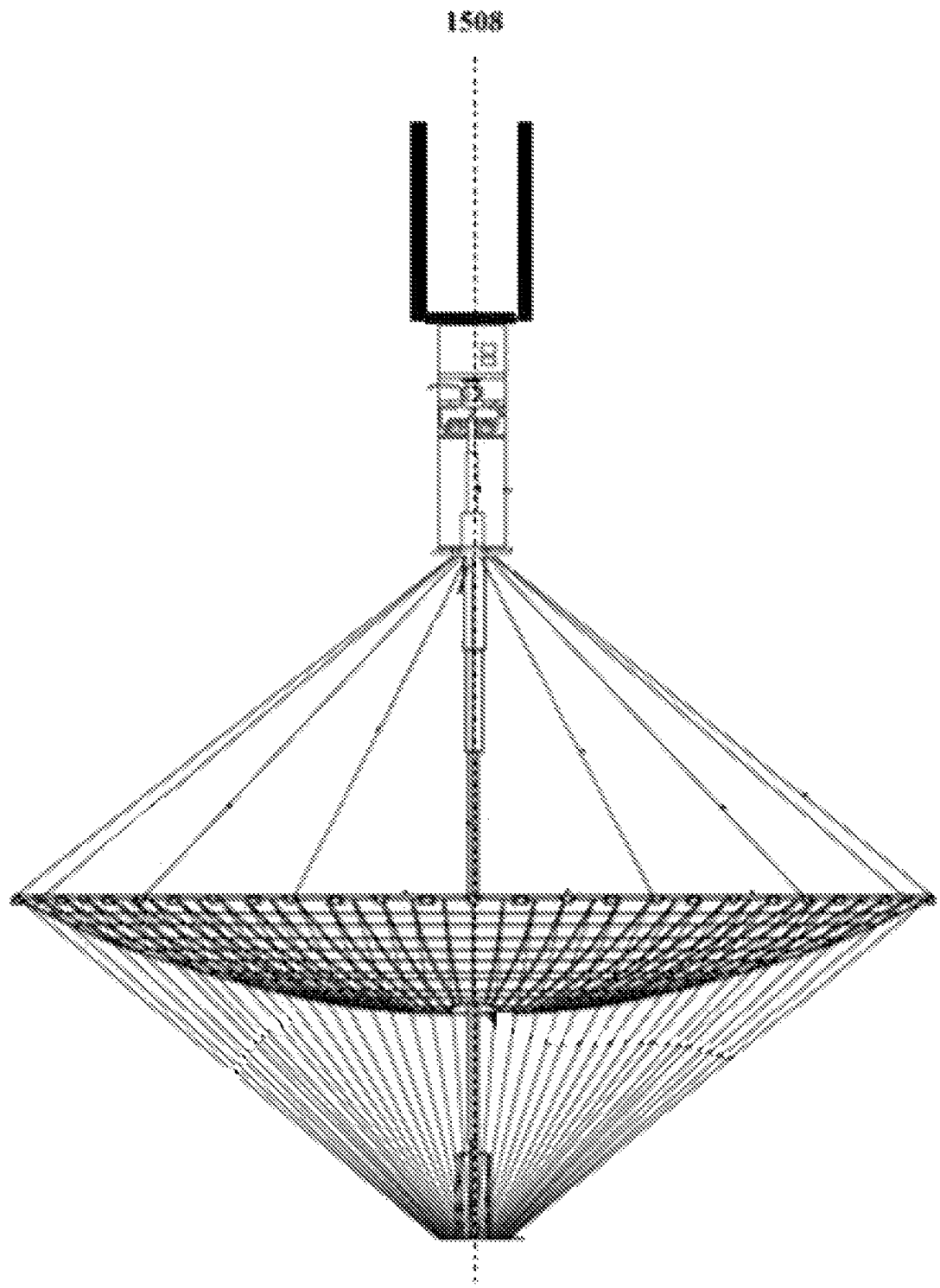
FIG. 16 is a side elevation view of the reflector antenna system of FIG. 15 showing the solar panels in a deployed configuration.

Referring now to FIGS. 15-16, there are provided illustrations that are useful for understanding how solar panels 1500, 1502 may be incorporated with the reflector antenna system 100. The solar panels 1500, 1502 are movable relative to the housing 102 as shown by arrows 1510, 1512. This movability of the solar panels 1500, 1502 can be facilitated by mechanical mechanisms such as hinges (not shown). Hinges are well known in the art, and therefore will not be described herein.

This movability allows the solar panels 1500, 1502 to be transitioned from their stowed position shown in FIG. 15 to their deployed position shown in FIG. 16. In the stowed position, the solar panels 1500, 1502 extend along the elongate length 1506 of the reflector antenna system 100 and parallel to a center elongate axis 1508 of the reflector antenna system 100. In order to transition the solar panels 1500, 1502 to the deployed position, the solar panels are rotated away from the reflector antenna system 100 until they extend in the opposite direction than that of the stowed position. In the deployed position, the solar panels 1500, 1502 extend out from the reflector antenna system 100 in a direction away from the reflector and extend parallel to the center elongate axis 1508 of the reflector antenna system 100. In this deployed position, the panels remain out of the RF beam shown in FIG. 9 or FIG. 14. Additional panels can be stacked in the stowed state and attached by a hinge at opposing ends such that in the deployed state the panels form a single line that extends further from the bus.

Figure 17:
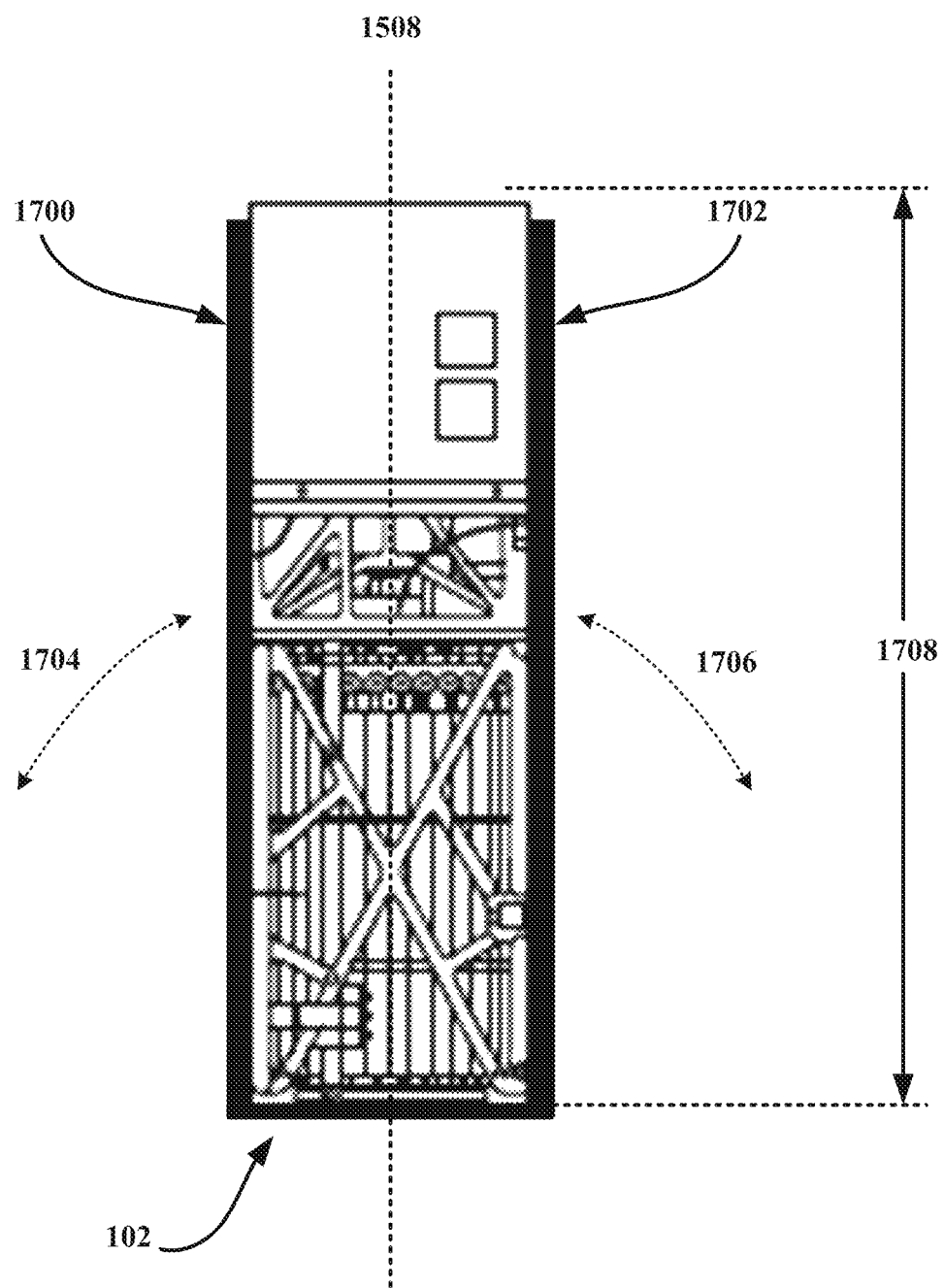
FIG. 17 is a side elevation view of a reflector antenna system with solar panels, shown in a stowed configuration.
Figure 18:
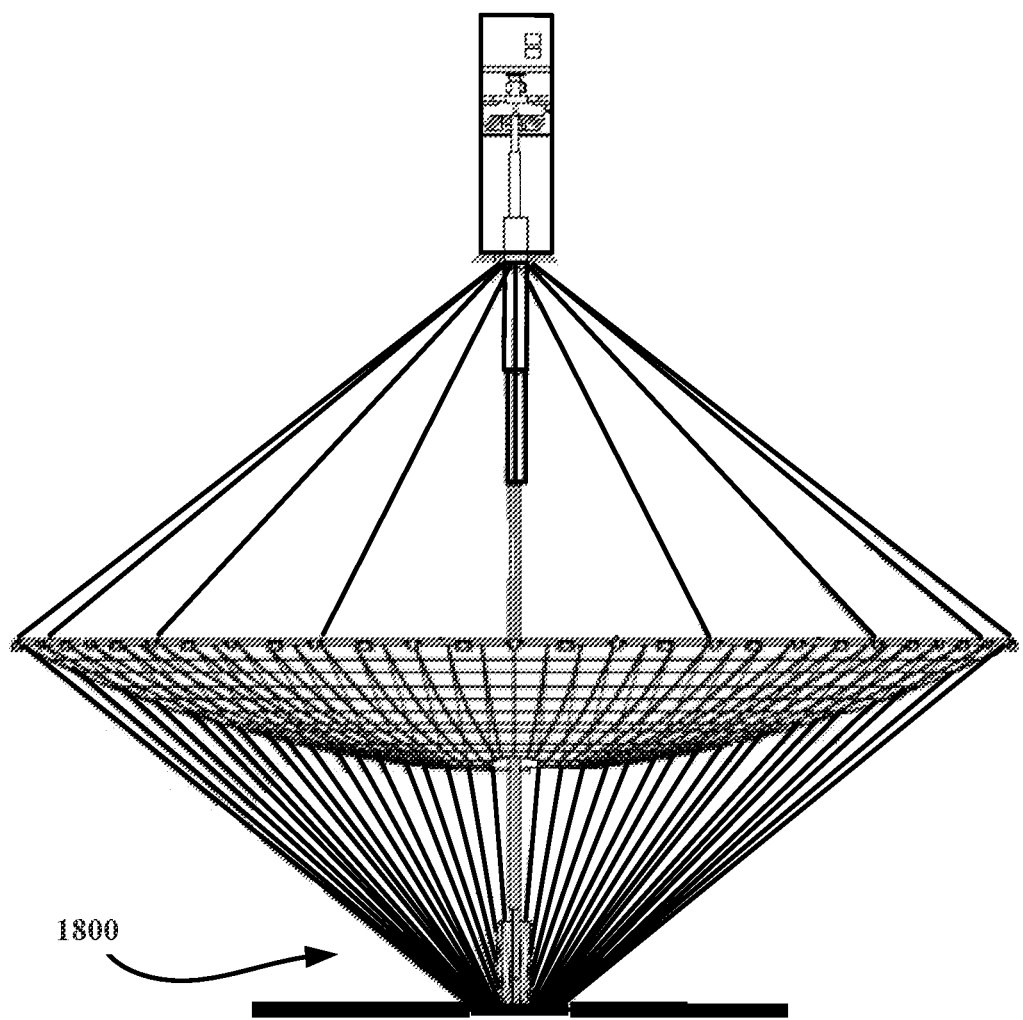
FIG. 18 is a side elevation view of the reflector antenna system of FIG. 17 showing the solar panels in a deployed configuration.
Figure 19:
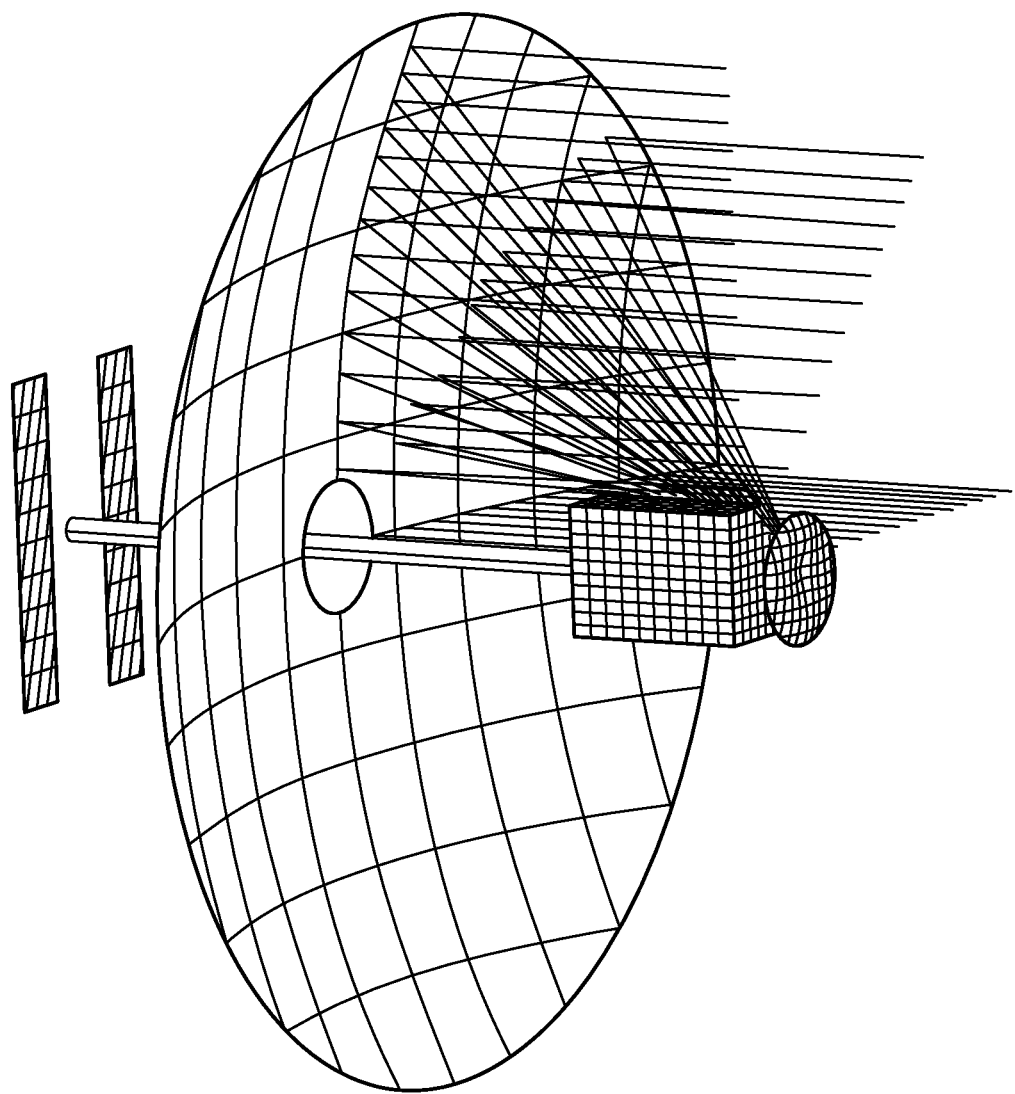
FIG. 19 provides a perspective view of the reflector antenna system shown in FIGS. 17-18.

The present solution is not limited to the particular solar panel arrangement of FIGS. 15-16. Thus, another illustrative solar panel arrangement is shown in FIGS. 17-19. In FIGS. 17-19, the solar panels 1700, 1702 are movable relative to the housing 102 as shown by arrows 1704, 1706. This movability of the solar panels 1700, 1702 can be facilitated by mechanical mechanisms such as hinges (not shown). Hinges are well known in the art, and therefore will not be described herein.

This movability allows the solar panels 1700, 1702 to be transitioned from their stowed position shown in FIG. 17 to their deployed position shown in FIGS. 18-19. In the stowed position, the solar panels 1700, 1702 extend along the elongate length 1708 of the reflector antenna system 100 and parallel to a center elongate axis 1508 of the reflector antenna system 100. In order to transition the solar panels 1700, 1702 to the deployed position, the solar panels are rotated away from the reflector antenna system 100 until they extend perpendicular to the center elongate axis 1508. In the deployed position, the solar panels 1700, 1702 reside below the reflector as shown in FIGS. 18-19. As such, the solar panels 1700, 1702 are coupled to a distal end 1800 of the boom.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A reflector antenna system, comprising:
a hoop assembly comprising a plurality of link members extending between a plurality of hinge members, the hoop assembly configured to expand between a collapsed configuration wherein the plurality of link members extend substantially parallel to one another and an expanded configuration wherein the plurality of link members define a circumferential hoop;
a mesh reflector secured to the hoop assembly such that when the hoop assembly is in the collapsed configuration, the mesh reflector is collapsed within the hoop assembly and when the hoop assembly is in the expanded configuration, the mesh reflector is expanded to a shape that is intended to concentrate RF energy in a desired pattern;
a mast assembly including an extendable boom, wherein the hoop assembly is secured by a plurality of cords relative to a top portion of the extendable boom and to a bottom portion of the extendable boom such that upon extension of the extendable boom to a deployed condition, the hoop assembly is supported by the extendable boom; and
an antenna feed that is located on or adjacent to a housing of a vehicle from which the extendable boom is deployed so as to face a concave surface of the mesh reflector that is intended to concentrate RF energy in the desired pattern;
wherein the antenna feed comprises at least one radiating element that is coupled to a proximal portion of the extendable boom so as to be suspended above a ground plate disposed on an external surface of the housing of the vehicle.

2. The reflector antenna system according to claim 1, wherein the antenna feed is configured to either illuminate the concave surface of the mesh reflector with radio frequency ("RF") energy or be illuminated by a reflector that has gathered RF energy from a distant source.

3. The reflector antenna system according to claim 1, wherein the antenna feed comprises a plurality of radiating elements which are disposed around a periphery of a proximal portion of the extendable boom to form an array adjacent to the housing of the vehicle from which the extendable boom is deployed.

4. The reflector antenna system according to claim 1, wherein the at least one radiating element is movably coupled to the extendable boom so that the at least one radiating element is able to be transitioned between a stowed position in which the at least one radiating element abuts the extendable boom and a deployed position in which the at least one radiating element extends out from the extendable boom.

5. The reflector antenna system according to claim 1, wherein the antenna feed comprises a coaxial feed which is axially aligned with the mast assembly.

6. The reflector antenna system according to claim 1, further comprising at least one solar panel that is movably coupled to a housing of the reflector antenna system or to the housing of the vehicle.

7. The reflector antenna system according to claim 6, wherein the at least one solar panel is movable between (A) a stowed position in which the at least one solar panel extends parallel to a center axis of the housing of the reflector antenna system or the vehicle in a first direction to (B) a deployed position in which the at least one solar panel extends parallel to the center axis of the housing of the reflector antenna system or the vehicle in a second opposed direction, the second opposed direction being away from the mesh reflector when expanded.

8. The reflector antenna system according to claim 6, further comprising at least one solar panel that is movably coupled to a distal end of the extendable boom such that the at least one solar panel can be transitioned between (A) a stowed position in which the at least one solar panel extends parallel to a center axis of the housing of the reflector antenna system or the vehicle to (B) a deployed position in which the at least one solar panel extends perpendicular to the center axis of the housing of the reflector antenna system or the vehicle and below a convex surface of the mesh reflector.

9. A reflector antenna system, comprising: a hoop assembly comprising a plurality of link members extending between a plurality of hinge members, the hoop assembly configured to expand between a collapsed configuration wherein the plurality of link members extend substantially parallel to one another and an expanded configuration wherein the plurality of link members define a circumferential hoop; a mesh reflector secured to the hoop assembly such that when the hoop assembly is in the collapsed configuration, the mesh reflector is collapsed within the hoop assembly and when the hoop assembly is in the expanded configuration, the mesh reflector is expanded to a shape that is intended to concentrate RF energy in a desired pattern; a mast assembly including an extendable boom, wherein the hoop assembly is secured by a plurality of cords relative to a top portion of the extendable boom and to a bottom portion of the extendable boom such that upon extension of the extendable boom to a deployed condition, the hoop assembly is supported by the extendable boom; an antenna feed that is located adjacent to a housing of a spacecraft from which the extendable boom is deployed so as to face a concave surface of the mesh reflector that is intended to concentrate RF energy in the desired pattern, the antenna feed comprising at least one radiating element that is coupled to a proximal portion of the extendable boom so as to be suspended above a ground plate disposed on an external surface of the housing of the spacecraft; and a housing in which at least the hoop assembly, reflector surface and mast assembly are stowed prior to deployment.

10. The reflector antenna system according to claim 9, wherein the antenna feed is configured to either illuminate the concave surface of the mesh reflector with radio frequency ("RF") energy or be illuminated by a reflector that has gathered RF energy from a distant source.

11. The reflector antenna system according to claim 9, wherein the antenna feed comprises a plurality of radiating elements which are disposed around a periphery of a proximal portion of the extendable boom to form an array adjacent to the housing of the spacecraft from which the extendable boom is deployed.

12. The reflector antenna system according to claim 9, wherein the at least one radiating element is movably coupled to the extendable boom so that the at least one radiating element is able to be transitioned between a stowed position in which the at least one radiating element abuts the extendable boom and a deployed position in which the at least one radiating element extends out from the extendable boom.

13. The reflector antenna system according to claim 9, wherein the antenna feed comprises a coaxial feed which is axially aligned with the mast assembly.

14. The reflector antenna system according to claim 9, further comprising at least one solar panel that is movably coupled to a housing of the reflector antenna system or to the housing of the spacecraft.

15. The reflector antenna system according to claim 14, wherein the at least one solar panel is movable between (A) a stowed position in which the at least one solar panel extends parallel to a center axis of the housing of the reflector antenna system or spacecraft in a first direction to (B) a deployed position in which the at least one solar panel extends parallel to the center axis of the housing of the reflector antenna system or spacecraft in a second opposed direction, the second opposed direction being away from the mesh reflector when expanded.

16. The reflector antenna system according to claim 14, further comprising at least one solar panel that is movably coupled to a distal end of the extendable boom such that the at least one solar panel can be transitioned between (A) a stowed position in which the at least one solar panel extends parallel to a center axis of the housing of the reflector antenna system or spacecraft to (B) a deployed position in which the at least one solar panel extends perpendicular to the center axis of the housing of the reflector antenna system or spacecraft and below a convex surface of the mesh reflector.

* * * * *